United States Patent
Han et al.

(10) Patent No.: US 11,514,333 B2
(45) Date of Patent: Nov. 29, 2022

(54) COMBINING MACHINE-LEARNING AND SOCIAL DATA TO GENERATE PERSONALIZED RECOMMENDATIONS

(71) Applicant: Meta Platforms, Inc., Menlo Park, CA (US)

(72) Inventors: Kun Han, Sunnyvale, CA (US);
Fuchun Peng, Cupertino, CA (US);
Benoit Dumoulin, Palo Alto, CA (US);
Bo Zeng, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1192 days.

(21) Appl. No.: 15/966,203

(22) Filed: Apr. 30, 2018

(65) Prior Publication Data

US 2019/0332946 A1    Oct. 31, 2019

(51) Int. Cl.
*G06N 5/02*        (2006.01)
*G06N 20/00*       (2019.01)
*G06F 16/2457*     (2019.01)

(52) U.S. Cl.
CPC ......... *G06N 5/02* (2013.01); *G06F 16/24578* (2019.01); *G06N 20/00* (2019.01)

(58) Field of Classification Search
CPC ..... G06N 5/02; G06N 20/00; G06F 16/24578
See application file for complete search history.

(56) References Cited

U.S. PATENT DOCUMENTS

| 2007/0078849 | A1 | 4/2007 | Slothouber |
| 2011/0252027 | A1* | 10/2011 | Chen ..................... G06F 16/335 707/728 |
| 2013/0080428 | A1 | 3/2013 | Wang et al. |
| 2017/0026318 | A1 | 1/2017 | Daniel et al. |

(Continued)

FOREIGN PATENT DOCUMENTS

| KR | 10-1567551 B1 | 11/2015 |
| KR | 10-1639987 B1 | 7/2016 |

OTHER PUBLICATIONS

Yu, Yang, Xiaojun Wan, and Xinjie Zhou. "User embedding for scholarly microblog recommendation." Proceedings of the 54th Annual Meeting of the Association for Computational Linguistics (vol. 2: Short Papers). 2016. (Year: 2016).*

(Continued)

*Primary Examiner* — Kevin W Figueroa
(74) *Attorney, Agent, or Firm* — Fenwick & West LLP (57) ABSTRACT

A computing device receives a message including a request for a recommendation. A representation of a hypothetical ideal recommendation to provide in response to the message is determined based on the message content. Data regarding entities that are potential recommendations are retrieved from a data store, the data regarding each entity including a representation of the entity (e.g., a vector) derived from factual information about the entity and opinions of other users of the entity. Ranking scores are determined for at least a subset of the entities based on the difference between the entity representations and the representation of the hypo- (Continued)

thetical ideal recommendation. An entity to recommend is selected based on the ranking scores and a reply to the message is sent that identifies the selected entity.

20 Claims, 5 Drawing Sheets

(56) References Cited

U.S. PATENT DOCUMENTS

2018/0121549 A1* 5/2018 Ramesh .............. G06F 16/9535

OTHER PUBLICATIONS

Catherine, Rose, et al. "Explainable entity-based recommendations with knowledge graphs." arXiv preprint arXiv: 1707.05254 (2017) (Year: 2017).*
Pazzani, Michael J., and Daniel Billsus. "Content-based recommendation systems." The adaptive web. Springer, Berlin, Heidelberg, 2007. 325-341. (Year: 2007).*
PCT International Search Report and Written Opinion, PCT Application No. PCT/US2018/030508, dated Feb. 19, 2019, eleven pages.

* cited by examiner

COMBINING MACHINE-LEARNING AND SOCIAL DATA TO GENERATE PERSONALIZED RECOMMENDATIONS

BACKGROUND

This disclosure relates generally to computer-based recommendation systems, and in particular to improving the efficiency of servicing user requests for recommendations.

As the availability of computing power has gone up, while the size of computing devices and associated costs have gone down, the range of uses for computing devices has increased. One area of recent growth has been virtual assistants, which are now available on many smartphones as well as through stand-alone devices. Virtual assistants interact with users to assist them in completing various tasks. For example, a user might ask a virtual assistant for recommendations, such as movies to watch, restaurants to eat at, or music to listen to.

However, producing accurate recommendations automatically is difficult. There is a large amount of information available on the internet, from consumer review and comments to databases of information about various entities (such as movies, restaurants, songs, etc.). Determining which information is relevant and how it should be combined to produce recommendations is a complex and time-consuming task. This is particularly problematic in the context of virtual assistants, where the user asks a question and expects an almost immediate response as if they are speaking to another person. If the user then has to spend significant time verifying the quality of the recommendations (e.g., checking reviews, asking friends, determining suitability for children, etc.), and/or narrowing the request by providing additional information, the experience may be inefficient and unsatisfying.

SUMMARY

A virtual assistant can provide recommendations of various entities to users. Examples include movies, restaurants, music, and books. By using available information about the user requesting recommendations as well as information about entities about which other users have a positive opinion, a virtual assistant can provide recommendations that are personalized and likely to provide value to the user. Furthermore, these recommendations may be provided efficiently and quickly, without having to solicit additional information from the user.

In one embodiment, a computing device receives a message including a request for a recommendation. A representation of a hypothetical ideal recommendation to provide in response to the message (e.g., a vector) is determined based on the message content. Data regarding entities that are potential recommendations are retrieved from a data store, the data regarding each entity including a representation of the entity (e.g., a vector) derived from factual information about the entity and opinions of other users of the entity. Ranking scores are determined for at least a subset of the entities based on the difference between the entity representations and the representation of the hypothetical ideal recommendation. An entity to recommend is selected based on the ranking scores and a reply to the message is sent that identifies the selected entity.

In other embodiments, potential entity recommendations are also identified by analyzing the message content to determine the user's intent and searching a database to find entities consistent with that intent. Ranking scores may also be calculated for these entities based on an affinity of the requesting user for the entity and/or the opinions of other users. The two sets of ranking scores may then be combined to create a merged, ranked list. Where the same entity has two rankings scores (one based on the hypothetical ideal recommendation and one from the database search), a combined ranking score may be determined by combining the two ranking scores.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Various embodiments of a virtual assistant are described below. The virtual assistant may provide recommendations to a user in response to requests from the user. The virtual assistant recommendations are generally described with reference to specific examples where the recommendations are for movies. However, the recommendations may be for other entities, such as restaurants, books, music, and the like.

System Architecture

Figure 1:
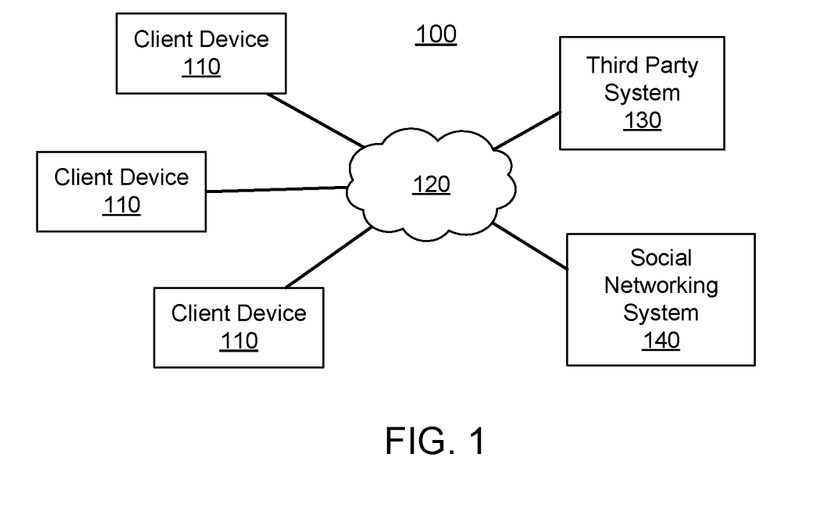
FIG. 1 is a block diagram of a system environment in which a virtual assistant operates, in accordance with an embodiment.

FIG. 1 is a block diagram of a system environment 100 for an online system 140 (e.g., a social networking system). The system environment 100 shown by FIG. 1 comprises one or more client devices 110, a network 120, one or more third-party systems 130, and the online system 140. In alternative configurations, different and/or additional components may be included in the system environment 100. For example, the online system 140 may alternatively be a content sharing network or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a tablet, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. The client devices 110 may execute or interact with the virtual assistant 240. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network XX20 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices for use by an application executing on the client device. In other embodiments, a third party system 130 provides content or other information for presentation via a client device 110. A third party system 130 may also communicate information to the online system 140, such as advertisements, content, or information about an application provided by the third party system 130.

The online system 140 includes a virtual assistant 240 that provides assistance with performing tasks to a user. The functionality provided by the virtual assistant 240 includes making personalized recommendations of entities such as movies, restaurants, and songs. The virtual assistant 240 leverages data available in the online system, such as social data indicating the opinions of other users of the entities, as well as information about the user's tastes and interests, to provide recommendations in which the user is likely to find value. Furthermore, in various embodiments, the data used to generate recommendations are processed using vector-based techniques. This may enable the recommendations to be provided quickly, providing an efficient, conversational style interface between the user and the virtual assistant 240.

Figure 2:
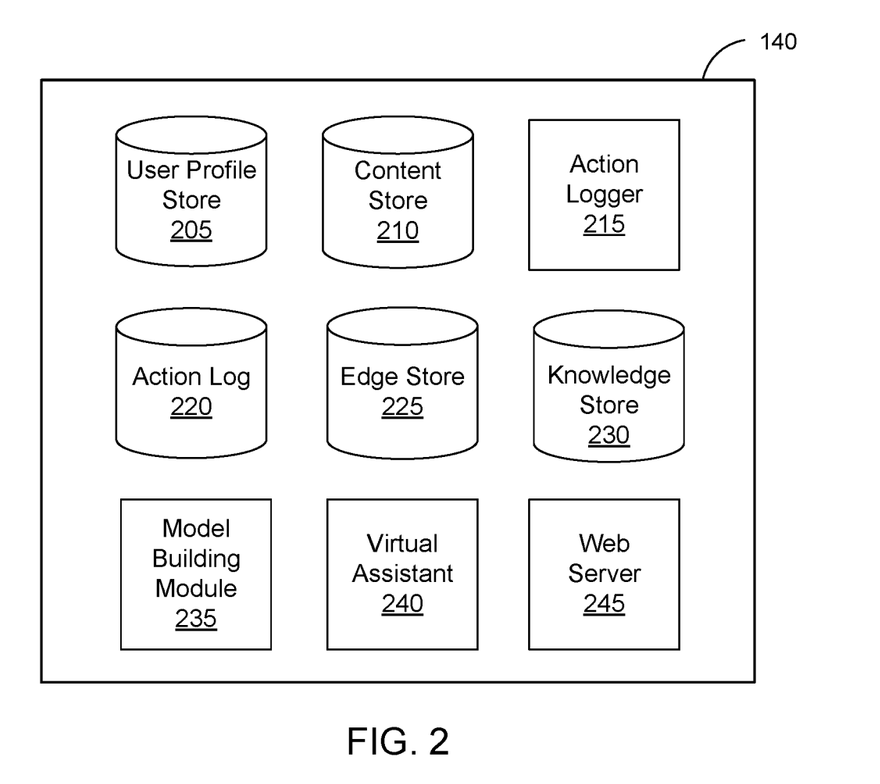
FIG. 2 is a block diagram of the online system shown in FIG. 1, in accordance with an embodiment.

FIG. 2 is a block diagram of an architecture of the online system 140, according to an embodiment. The online system 140 shown in FIG. 2 includes a user profile store 205, a content store 210, an action logger 215, an action log 220, an edge store 225, a knowledge store 230, a model building module 235, a virtual assistant 240, and a web server 245. In other embodiments, the online system 140 may include additional, fewer, or different components for various applications. For example, some embodiments may omit the model building module 235 with the model or model used being provided from another system. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

In one embodiment, a user profile includes data indicating the user's opinion of movies (or other entities that may be recommended). This data may include the user: selecting the movie as a favorite movie, "liking" a page for the movie in a social network, visiting the movie's page, commenting on the movie's page, and the like. In the case of the user commenting on the movie's page, data may include an indication of whether the comment is expressing a positive or negative opinion of the movie (e.g., as generated by a sentiment analysis algorithm). Furthermore, different actions of the user may have different weightings in determining the user's overall opinion of a movie. For example, "liking" the movie's page may be weighted more strongly than visiting it.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

In various embodiment, the objects in the content store 210 include status updates and/or other types of messages in which users request recommendations for movies or other entities from other users of the online system 140. These status updates and/or other types of messages may be stored in conjunction with one or more responses (e.g., comments) from other users. Some or all of these responses may include recommendations, while other responses may not. For example, a user might request recommendations for sci-fi movies and a first response might recommend a particular sci-fi movie while a second response might suggest the user considers romantic comedies instead.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system, as well as actions on third party systems 130 that communicate information to the online system. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that may be included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system. For example, an e-commerce website may recognize a user of an online system 140 through a social plug-in enabling the e-commerce website to identify the user of the online system. Because users of the online system 140 are uniquely identifiable, e-commerce websites, such as in the preceding example, may communicate information about a user's actions outside of the online system to the online system for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system based on the actions performed by the user. A user's affinity may be computed by the online system 140 over time to approximate the user's interest in an object, in a topic, or in another user in the online system based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The knowledge store 230 stores information that is known or assumed to be factual, according to one embodiment. The information in the knowledge store 230 may thus be treated as ground truth data. The virtual assistant 240 may use this information to generate recommendations that are more likely to provide value to the user. In contrast to the edge store 225, which stores information about connections users and other objects that can be used as a proxy for real world connections, the knowledge store 230 stores information established from outside of the online system 140. For example, if the user asks "what is a good sci-fi movie that I could watch tonight?" the virtual assistant 240 might retrieve a list of movie screenings from a third party system 130 and determine which of those movies are sci-fi movies based on genre information in the knowledge store 230.

In one embodiment, the knowledge store 230 includes a knowledge graph of information about entities that might be recommended (movies, restaurants, books, songs, etc.). The knowledge graph includes a node for each entity that includes an identifier of the entity (e.g., a title, unique identifying number, etc.). The nodes may be split into domains of different types of the corresponding entities (e.g., a movies domain, a restaurants domain, etc.) enabling easy filtering to identify entities to recommend that are relevant to a request. The node for an entity is linked to child nodes that store different information about the entity. For example, in the case of a movie, the child nodes might include: genre, cast, crew, a summary of the plot, and the like. The child nodes may store the information itself or pointers/links to where the information is located in the system environment 100. The knowledge graph may be indexed to enable queries to identify entities that meet specified criteria (e.g., a query to identify movies in a specified genre).

The model building module 235 builds and trains a machine-learning model (e.g., a neural network) for servicing user requests for recommendations. In one embodiment, the model building module 235 uses human-generated recommendations (e.g., from the content store 210) as training data. Users make posts on a social networking site requesting recommendations and other users comment with suggestions. These suggestions provide positive examples of recommendations that service the original request. They may also provide information about the tastes of the recommenders (e.g., it may be inferred that a user likes a movie that the user recommends to a friend). Various embodiments of the model building module 235 are described in greater detail below, with reference to FIG. 3.

The virtual assistant 240 interacts with users via their client devices 110 to provide assistance with tasks, including providing recommendations. A user submits a request to the virtual assistant 240 via user input at a client device 110. In one embodiment, the virtual assistant 240 appears as a contact in a messaging application on the client device 110. In another embodiment, the user interacts with the virtual assistant 240 using a virtual assistant application on the client device 110. Alternatively, the virtual assistant 240 may itself be an application running on the client device 110.

The virtual assistant 240 parses requests it receives to identify the user's intent. An intent corresponds to a particular task that the user intends for the virtual assistant 240 to perform. In various embodiments described herein, the user's intent falls under the general category of requests for movie recommendations. Within this general category, there may be many different specific intents, such as recommendations for science fiction movies, movies suitable for children, movies starring a specific actor, and the like. In other embodiments, the virtual assistant 240 may additionally or alternatively provide recommendations for other types of entity, such as restaurants, music, or TV shows, etc., using similar techniques to those described for movies.

In one embodiment, the virtual assistant 240 applies a machine-learned model to generate a ranked list of recommendations based on the user's intent and information about the user. Various embodiments of the machine-learned model are described in greater detail below, with reference to FIG. 3. The virtual assistant 240 may also generate a second ranked list of recommendations based on a knowledge graph (e.g., information stored in the knowledge store 230) and a social graph (e.g., information stored in the edge store 225 and/or user profile store 205). For example, if a user requests recommendations for horror movies, the virtual assistant might use the knowledge graph to identify horror movies and the social graph to rank the identified movies based on popularity among the users (or a subset of the users) of a social network. The virtual assistant 240 may combine the two ranked lists to generate a set of recommendations to present to the user. Various embodiments of the virtual assistant 240 are described in greater detail below, with reference to FIG. 4.

The web server 250 links the online system 140 via the network 120 to the one or more client devices 110, as well as to the one or more third party systems 130. The web server 250 serves web pages, as well as other content, such as JAVA®, FLASH®, XML, and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Example Recommendation Systems

Figure 3:
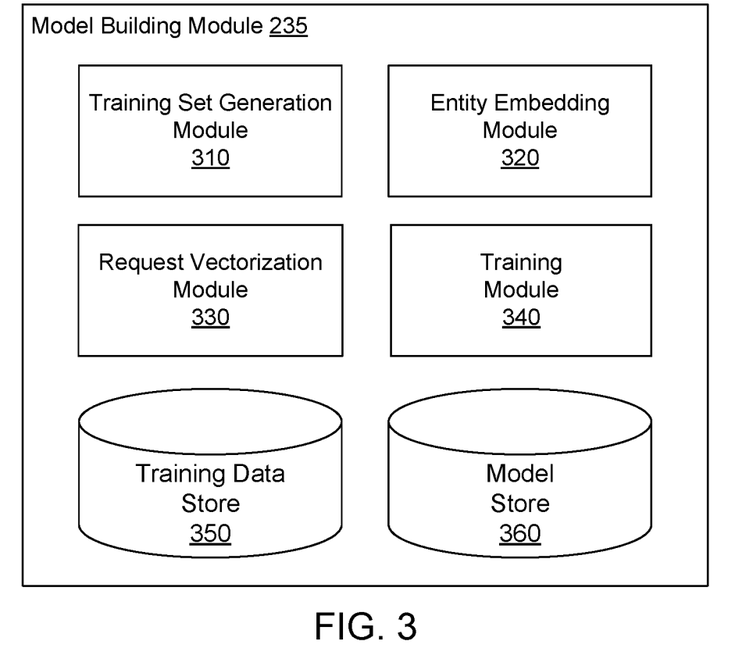
FIG. 3 is a block diagram of the model building module shown in FIG. 2, in accordance with an embodiment.

FIG. 3 shows one embodiment of the model building module 235. The model building module 235 trains machine-learning models (e.g., neural networks) to map user requests for recommendations to recommendations that are responsive to the request. In the embodiment show, the model building module 235 includes a training set generation module 310, an entity embedding module 320, a request vectorization module 330, a training module 340, a training data store 350, and a model store 360. In other embodiments, the model building module 235 contains different and/or additional elements. In addition, the functions may be distributed among the elements in a different manner than described.

The training set generation module 310 generates a set of training data for training a model. In various embodiments, the training set generation module 310 analyzes content items in the content store 210 (e.g., social network posts) to identify a set of content items that include requests for recommendations for a particular type of entity (e.g., requests for movie recommendations). The training set generation module 310 retrieves responses to the request (e.g., comments on the social network response) and analyzes the responses to identify references to entities. The training set generation module 310 applies a contextual analysis to determine whether such references are recommendations in response to the request. This analysis may consider: the content of the response itself, whether the user requesting recommendations "likes" or otherwise indicates approval of the response, the content of other responses to the request (e.g., a user commenting "yeah, that's a good one" immediately after the response with the potential recommendation), and the like.

In one such embodiment, the analysis of a response includes determining if the message includes a link to an entity of the requested type (e.g., if the request is for movies, for a link to a movie page in a social network). If there is a link to an entity of the requested type, this may be assumed to be a recommendation. The analysis may also include analyzing text in the response to determine if it includes words that are likely to correspond to an entity of the requested type. For example, in the case of requests for movies, the text in the response could be compared to a list of known movies for a match. If the response includes text that matches the name of a known entity of the requested type, this may be assumed to be a recommendation. The analysis results in a set of request/response pairs including a request for recommendations from a user and a recommended entity from a response to the request made by another user. A given request may generate several request/response pairs as the request may generate several responses from other users and those responses may each include one or more recommendations. In other embodiments, other ways of pairing requests for recommendations and the resulting recommendations of entities may be used.

The entity embedding module 320 creates vectors that represent the recommended entities (e.g., movies, restaurants, etc.) in the training set. This process is called embedding because it embeds information about the entity (which may or may not be numerical) into a vector representation that can be provided as input to a machine-learning model. In one embodiment, where the model is being trained to recommend movies, the embedding process uses two types of input data: entity description data and user affinity data. In other embodiments, the vector representation of a movie may be based on different and/or additional data.

The entity description data is factual information about the movie (e.g., retrieved from the knowledge store 230 or a third party system 130). The entity description data may include genre, release date, director, cast, a short summary of the plot, and the like. In one embodiment, the entity embedding module 320 concatenates the available information about the movie in to a string, applies a word embedding algorithm to generate a vector, and uses a pooling technique (e.g., average pooling) to reduce the vector to one of a predetermined length. Thus, the factual information about a movie may be embedded into a vector of predetermined length.

The user affinity data indicates the opinions of users (e.g., those soliciting or giving recommendations in the training set) about the movies in the training set. For example, a positive opinion of the movie may be inferred from a user "liking" a movie, adding the movie to a list of favorite movies, recommending the movie to another user, and the like. In various embodiments, the entity embedding module 320 creates initial embeddings for the movies and modifies the embeddings based on the user affinity data. Generally, if a given user is inferred to have a positive opinion of a first movie and a second movie, but a negative (or no) opinion of a third move, the first movie should be closer to the second movie in the vector space than the third movie. The entity embedding module 320 may start with the vectors generated from the entity description data or may start with separate (e.g., random) vectors and then concatenate the result of the training with the movie description vector.

In one embodiment, a dictionary is built that maps the movies to d-dimensional intensity vectors. Each movie may be represented as a set or "bag" of other entities (e.g., genre, studio, director, cast, etc.). A user may be represented by a vector that is a combination of the d-dimensional intensity vectors of a particular set of movies for which the user has indicated an affinity. In other words, the vector representations of each of the movies for which the user has indicated an affinity may be combined in any suitable way (e.g., a sum), and the combination of the vector representations may be the d-dimensional intensity vector representation of the user.

In the same example, one movie of the set may be removed from the set, and the user may be represented by a vector that is a combination of the vector representations of the set excluding the removed movie. The removed movie may be randomly selected from the set of movies. In training, a loss function may be used that compares the d-dimensional intensity vector for the user with d-dimensional intensity vectors of entities that are negative examples, meaning they are not in the set (e.g., movies for which the user has not expressed an affinity). This comparison may be, for example, a dot product of the two vectors or any other suitable combination. The movies may be ranked based on the comparisons and the embeddings modified so that the removed movie is ranked higher than each of the negative examples. For example, if a particular movie that was not liked by the user is ranked above the removed movie (e.g., a movie that was liked by the user), the entity embedding module 320 may adjust the vector representation of the movie that was not liked by the user so that it is ranked below the removed movie.

Whether the entity embedding module 320 applies the user affinity data to modify the vector generated from the movie data, concatenates the user affinity and movie data vectors, or combines them in some other way, the result is a vector that includes information about the movie itself as well as which users like the movie. In the case where users are represented as a vector generated by all of the movies that user has indicated an affinity with, the information about which users like a given movie may be viewed as a representation of a hypothetical user with the perfect movie taste to enjoy the given movie. Thus, the difference between that that hypothetical user and another user provides a measure of how likely the other user is to enjoy the given movie. The entity embedding module 320 stores the vector in association with an identifier of the movie (e.g., in the training data store). This process may be used to generate a vector representation of each movie that was recommended in the training data. It may also be used to generate vector representations of other movies that were not recommended to use as negative examples when training the model.

The request vectorization module 330 converts the requests for recommendations in the training set into vectors. In various embodiments, the request vectorization module 330 uses two types of input: the content of the request and information about the user making the request. Alternatively, just the request may be used, in which case, the resulting recommendations generated by the model will be generalized rather than specific to the requesting user.

In one embodiment, the request vectorization module 330 treats the content of the request as a bag of words and applies a word embedding algorithm to generate a vector. This technique may have the advantage of being computationally inexpensive. In another embodiment, the request vectorization module 330 considers the semantic context of the words in the request by applying a recurrent neural network with an attention mechanism to interpret the meaning on the sentence and generate a vector based on that meaning. For example, in the sentence "I like sci-fi movies," the word sci-fi should be given greater weight than the other terms in the context of requests for movie recommendations because that is the word that determines whether a given recommendation is appropriate.

The request vectorization module 330 generates a vector from information about the user that made the request for recommendations. In one embodiment, the request vectorization module 330 identifies movies that the user has indicated an affinity for (e.g., by "liking" them on a social networking page). As described previously, with reference to the entity embedding module 220, a user may be represented by a combination of vectors (e.g., a sum) representing movies for which the user has indicated an affinity. Thus, the request vectorization module 330 may retrieve the vector representation of movies for which the user has indicated an affinity (e.g., from the training data store 350) and combine them to generate a vector representing the user. Alternatively, a vector representing the user that was previously generated (e.g., by the entity embedding module 220) may be used. In other embodiments, other approaches may be used to generate a vector representing the user.

The request vectorization module 330 combines the vector generated from the content of the request with the vector generated from information about the user. The vectors may be combined by concatenation or any other suitable method. Regardless of the specific approach used, the result is a vector representing the request for recommendations that includes information about the content of the request (e.g., what is being requested, such as sci-fi movies, kids movies, etc.) and information about the user (e.g., movies with which the user has already indicated an affinity).

The training module 340 trains a machine-learning model (e.g., a neural network) to map vectors representing requests (e.g., as generated by the request vectorization module 330) to vectors representing hypothetical ideal movies that would be responsive to the requests. The machine-learning model maps an input vector representing a request into an output vector with the same format (e.g., number of elements) as the vectors representing movies (e.g., as generated by the entity embedding module 320). The initial configuration of the model may be chosen at random, by a human user, or using any other appropriate method.

In one embodiment, the training module 340 trains the model by applying it to vectors generated from the requests in the training set. For a given vector input, the training module 340 identifies a vector representing a movie that one of the requesting user's friends actually recommended in response to the request as a positive example. The training module 340 also randomly selects another vector representing a movie from the training data as a negative example. Assuming that the training data set is sufficiently large, the likelihood of a randomly selected negative example in fact being a good response to the request will be sufficiently small that the model may still be successfully trained. Alternatively, negative examples may be identified in other ways, such as selection by a human operator.

The training module 340 calculates the distance in vector space between the hypothetical ideal movie vector for the request and the positive example. The training module 340 also calculates the distance in vector space between the hypothetical ideal movie vector for the request and the negative example. If the model is well trained, the distance for the positive example will be less than the distance for the negative example. Thus, the difference between these distances may define a cost function that can be used to train the machine-learning model. The application of the machine-learning model to a request may be considered a success if the distance for the positive example is below a distance threshold. A determination of success may also require that the distance for the positive example is less than the distance for the negative example or that distance for the positive example is less than the distance for the negative example by at least a difference threshold. The training module 340 may use different or additional rules for evaluating whether application of the model to a request was successful.

Regardless of the precise cost function used, the training module 340 trains the model by updating it (e.g., by applying a backpropagation algorithm) such that the hypothetical ideal movie vector it generates for the requests in the training data are close to the vectors representing movies that were actually recommended by users in response to the request. For example, the training module 340 may aim to maximize the average difference between the distances calculated for the positive and negative examples across the training set.

In one embodiment, the training module 340 also validates the training of the model. Validation may be performed by generating a set of validation data using the same or similar techniques as those used to generate the training set (but with different requests and recommendations). The training module 340 then applies the trained model to the validation data to validate that the resulting hypothetical ideal movie vectors are close to the actual recommendations provided by users is response to the requests in the validation set. If validation fails according to a pre-defined metric (e.g., the average distance between the hypothetical ideal movie vectors and actual user-generated recommendation exceeds a validation threshold) then the model training process may be modified and the model retrained.

The training data store 350 includes one or more computer-readable media configured to store the training data. The training data may include multiple training data sets. The training data store 350 may also store training data for different types of recommendations (e.g., movie recommendations, restaurant recommendations, book recommendations, etc.).

The model store 360 includes one or more computer-readable media configured to store the model or models built by the model building module 235. In one embodiment, the model store 360 stores multiple models along with the training and validation results for each. This may enable a human operator to select a model to use in a deployment environment. The model store 360 may also store models for different types of recommendations (e.g., movie recommendations, restaurant recommendations, book recommendations, etc.)

Although the training data store 350 and model store 360 are shown in FIG. 3 as separate entities within the model building module 235, in one embodiment, a single data store (e.g., a hard drive) is used to store the training data and the models. In another embodiment, the training data store 350 and/or the model store 360 may be located elsewhere in the system environment 100.

Figure 4:
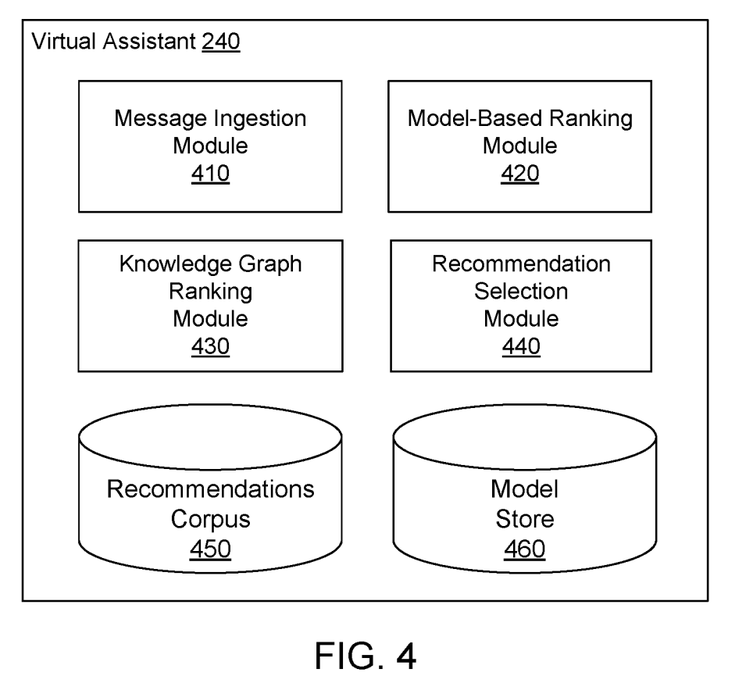
FIG. 4 is a block diagram of the virtual assistant shown in FIG. 2, in accordance with an embodiment.

FIG. 4 shows one embodiment of the virtual assistant 240. In the embodiment shown, the virtual assistant 240 includes a message ingestion module 410, a model-based ranking module 420, a knowledge graph ranking module 430, a recommendation selection module 440, a recommendations corpus 450, and a model store 460. In other embodiments, the virtual assistant 240 contains different and/or additional elements. In addition, the functions may be distributed among the elements in a different manner than described.

The recommendations corpus 450 includes one or more computer-readable media configured to store data objects representing entities that are potential recommendations to provide to users. In one embodiment, the data object for an entity includes an identifier for the entity (e.g., a name, title, or unique identifying number), one or more types for the entity (e.g., movie, restaurant, etc.), and a vector representing the entity. The vector may be generated in the same or a similar manner as used by the entity embedding module 320. Thus, the vector includes information about the entity itself and which users have indicated an affinity with the entity. Although the recommendations corpus 450 is shown as part of the virtual assistant 240, in some embodiments, the data objects representing entities may be located elsewhere.

The model store 460 includes one or more computer-readable media configured to store machine-learned models that are used by the virtual assistant 240 to identify potential recommendations from among the recommendations corpus 450. In one embodiment, the model store 460 includes a model for each type of entity that may be recommended. For example, there might be a model for movie recommendations, a model for song recommendations, and a model for restaurant recommendations. As the models may take information about a requesting user as an input, the models themselves may be generic in the sense that the same model may be used by multiple users to produce different recommendations. Although the model store 460 is shown as part of the virtual assistant 240, in some embodiments, the models may be stored elsewhere The message ingestion module 410 receives messages from client device 110 of users. In one embodiment, a user may create a message by entering text or with verbal utterances. If the user enters text, the message may be a copy of the text entered by the user. If the user makes a verbal utterance, the message may include an audio recording of the utterance. The message ingestion module 410 converts the audio recording to text with a speech-to-text algorithm. Alternatively, the recording may be converted to text by the client device 110 before it is sent to the virtual assistant 240.

The message ingestion module 410 parses a received message to determine whether the user intends for the virtual assistant 240 to provide a recommendation (e.g., a movie recommendation) in response to the message. In one embodiment, the message is analyzed to identify a specific request for recommendations (e.g., "what movies should I see?"). In another embodiment, the message ingestion module 410 identifies that the message is generally related to a topic for which the virtual assistant 240 may provide recommendations (e.g., the message includes the word "movies" or includes a reference to a particular movie). In this case, the message ingestion module 410 may ask the user whether they wish to receive recommendations (e.g., by sending a reply reading "Do you wish to see some recommended movies?"). Alternatively, the message ingestion module may automatically provide a recommendation without seeking confirmation of the user's intent (e.g., in an embodiment where the recommendations will be presented to the user in a portion of the user interface where they will not substantially interfere with other operations of the virtual assistant 240 if the user is not interested in the recommendations).

The model-based ranking module 420 generates a ranked list of recommendations using a machine-learned model (e.g., a model built by the model building module 235) in response to the message ingestion module 410 determining that the received message contains a request for recommendations. In one embodiment, the model-based ranking module 420 converts the message into an input vector for a machine-learned model. The model-based ranking module 420 may use the same (or similar) techniques as used by the request vectorization module 330 during training of the model. Thus, the input vector may include information derived from the request as well as information about the user making the request (e.g., based on vector representations of all of the movies for which the user has previously indicated an affinity).

The input vector is provided to a machine-learned model (e.g., a neural network) which maps it to a vector representing a hypothetical ideal movie. The model-based ranking module 420 searches a corpus of potential recommendations (e.g., the recommendations corpus 450) to identify a set of ranked recommendations based on similarities between the hypothetical ideal movie vector and vectors representing the potential recommendations. In one embodiment, the similarity between two vectors is defined by a distance metric (e.g., a cosine similarity). The model-based ranking module 420 may use a k-nearest neighbor search, which finds the k movies represented by vectors that are most similar to the hypothetical ideal movie vector. In another embodiment, an approximate nearest neighbor (ANN) search is used to identify a set of movies that most closely match the hypothetical ideal movie.

Regardless of the specific method used, the result is a set of movies and corresponding distances between vectors representing the movies and the hypothetical ideal move vector. The set may include a pre-determined number of movies (e.g., five) or any movie for which the distance is less than a recommendation threshold. Hybrid approaches may also be used, such as including any movie for which the distance is less than the recommendation threshold but no more than a pre-determined number (e.g., ten).

The model-based ranking module 420 can use the distances to rank the movies. In one embodiment, the model-based ranking module 420 treats the distances as ranking scores and ranks the movies such that the movie with the lowest score is the highest ranked, etc. In other embodiments, the model-based ranking module 420 may calculate a score for each movie based on the distances and other factors, such as whether the user has previously seen the movie, popularity of the movie with the user's friends within a social network, and the like. The model-based ranking module 420 then orders the movies in the ranked list based on the ranking scores (e.g., highest to lowest).

The knowledge graph ranking module 430 generates a second ranked list of recommendations based on a knowledge graph (e.g., the information in the knowledge store 230). In one embodiment, the knowledge graph ranking module 430 analyzes the message by applying a natural language understanding algorithm to determine a specific intent for the message. For example, while the message ingestion module 410 may establish a general intent (e.g., desiring movie recommendations) that is used by the model-based ranking module 420, the knowledge graph ranking model 430 may also establish one or more features for the desired recommendations (e.g., movies suitable for kids, movies starring a certain actor, etc.). The natural language understanding algorithm may be machine-learned using a training set of messages with human-generated labels of the corresponding intent. In another embodiment, the intent determined by the message ingestion module 410 may identify one or more features for the desired recommendations and the knowledge graph ranking module 430 may rely on that intent to determine the desired features for the recommendations.

Regardless of how the user's intent is determined, the knowledge graph ranking module 430 queries the knowledge graph to identify movies with the desired features. For example, if the determined intent is "sci-fi movies," the knowledge graph ranking module 430 might query the knowledge graph for entities in a movie domain for which the genre child node includes the term "sci-fi." In various embodiments, the knowledge graph ranking module 430 calculates ranking scores for the identified movies based on opinions of other users regarding the movie (e.g., a number of "likes" of the movie within the online system 140, an average star rating given by users to the movie, etc.). Additionally or alternatively, the knowledge graph ranking module 430 may calculate an affinity score for a movie based on a profile of the user who is requesting the recommendations. For example, as described previously with reference to the model-based ranking module 420, a user may be represented by a vector generated by combining vectors representing the movies for which that user has indicated an affinity. Thus, the affinity score for a movie may be based on a distance between the vector representing the user and a vector representing the movie. This distance indicates an affinity between the user and the movie. In one such embodiment, the ranking score for a movie is calculated by combining (e.g., adding) the ranking score generated based on the opinions of other users and the affinity score generated based on affinity between the user and the movie. The combination may be weighted to give one factor more impact on the final ranking.

Regardless of how the ranking scores are generated, the knowledge graph ranking module 430 creates the second ranked list of movies based on the ranking scores. In one embodiment, the second ranked list includes a predetermined number of movies (e.g., the five movies with the highest ranking scores). In other embodiments, any movie with a ranking score above a ranking score threshold may be included, or any movie with a ranking score above the ranking score threshold up to a maximum number (e.g., ten) may be included. The knowledge graph ranking module 430 may filter out movies and not include them in the second ranked list based on one or more criteria (e.g., movies the user has already seen, movies that are not showing in a movie theater within a certain distance of the user, movies that the user has previously indicated a negative opinion of, etc.).

The recommendation selection module 440 selects one or more recommendations to provide to the user based on the ranked lists generated by the model-based ranking module 420 and the knowledge graph ranking module 430. In one embodiment, the recommendation selection module 440 merges the ranked lists to generate a merged rank list. The ranked lists may be merged by adding the ranking scores from each list for movies to generate a combined ranking score and then re-ranking the movies based on combined ranking scores (e.g., highest to lowest). The ranking scores from each list may be normalized such that each contributes to the overall rankings in equal proportion. Additionally or alternatively, a weighted combination of the scores may be used. The recommendation selection module 440 selects one or more movies to recommend based on the merged rank list (e.g., the three highest ranked movies).

In another embodiment, the recommendation selection module 440 first considers the ranked list generated by the knowledge graph ranking module 430. If the ranking score generated by the knowledge graph ranking module 430 for one or more movies exceeds a knowledge graph ranking threshold, the recommendation selection module 440 recommends those movies. If no ranking score generated by the knowledge graph ranking module 430 exceeds the threshold, the recommendation selection module 440 creates the merged rank list and selects one or more movies to recommend based on the merged rank list, as described previously. This approach may provide better recommendations overall because it favors recommending movies with the requested features (e.g., sci-fi movies, movies suitable for kids, etc.) that are popular with other users before considering less well-known or less popular movies that the machine-learned model predicts the requesting user may like.

Regardless of how the one or more recommended movies are selected, the recommendation selection module 440 sends a message to the user's client device 110 identifying the movies. The message may identify the movies by name, include links to information about the movies, include links to websites where the user can view the movies online, include information about movie theaters showing the movies, etc. In some embodiments, the user may be able to purchase a copy of the movie or buy tickets to see the movie at a movie theater using controls embedded in the message or at a website for which a link was provide in the message. One of skill in the art may recognize various ways in which the recommendations may be presented to the user at a client device 110.

Example Computing System Architecture

Figure 5:
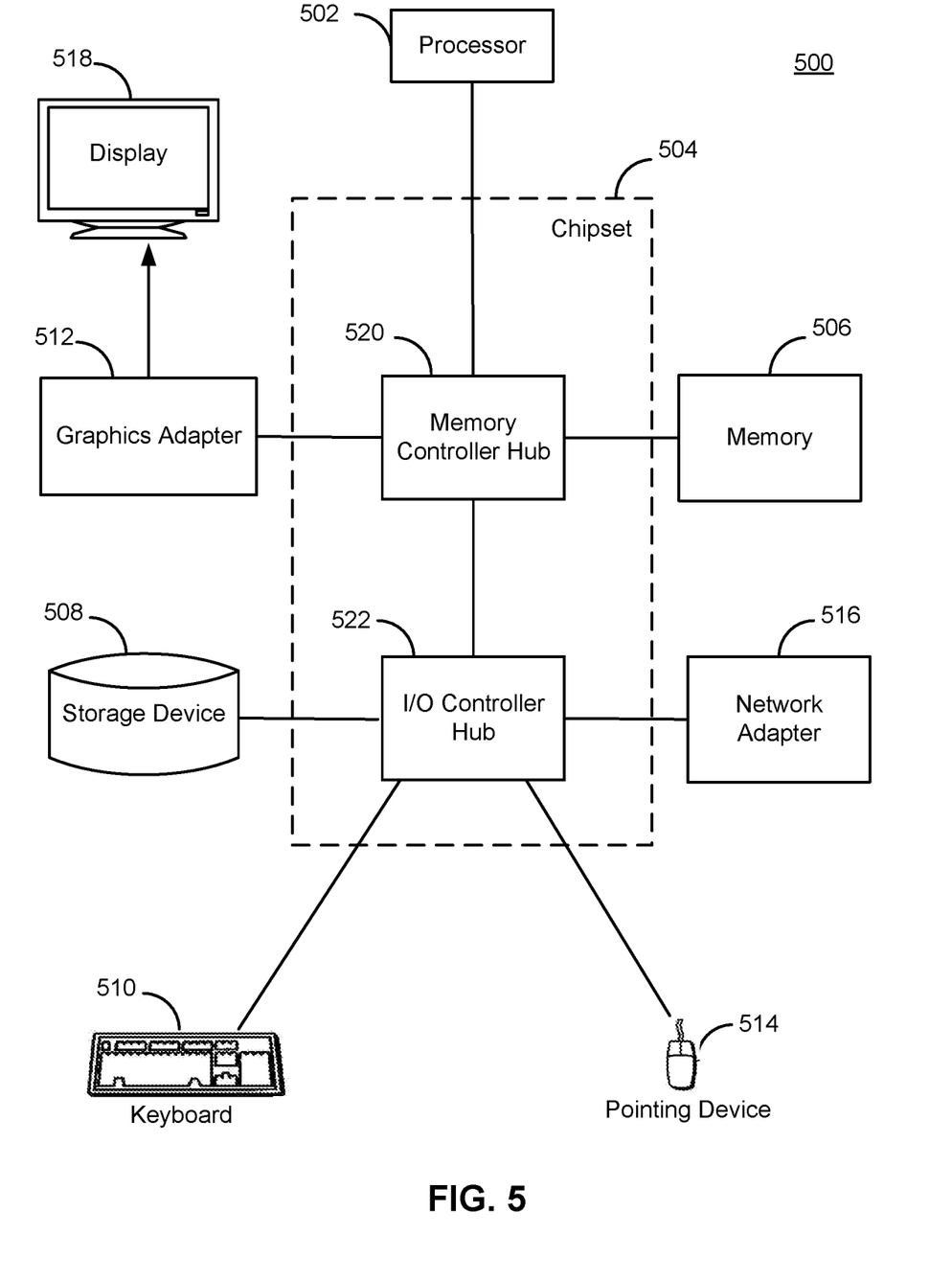
FIG. 5 illustrates a computer suitable for use in the system environment of FIG. 1, in accordance with an embodiment.

FIG. 5 is a high-level block diagram illustrating an example computer 500 suitable for use as a client device 110, third party system 130, or server in the online system 140. The example computer 500 includes at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and is used in combination with the keyboard 510 (which may be an on-screen keyboard) to input data into the computer system 500. The graphics adapter 512 displays images and other information on the display 518. The network adapter 516 couples the computer system 400 to one or more computer networks.

The types of computers used by the entities of FIGS. 1 through 4 can vary depending upon the embodiment and the processing power required by the entity. For example, the online system 140 might include a distributed database system comprising multiple blade servers working together to provide the functionality described. Furthermore, the computers can lack some of the components described above, such as keyboards 510, graphics adapters 512, and displays 518.

Example Methods of Training and Applying a Recommendation Model

Figure 6:
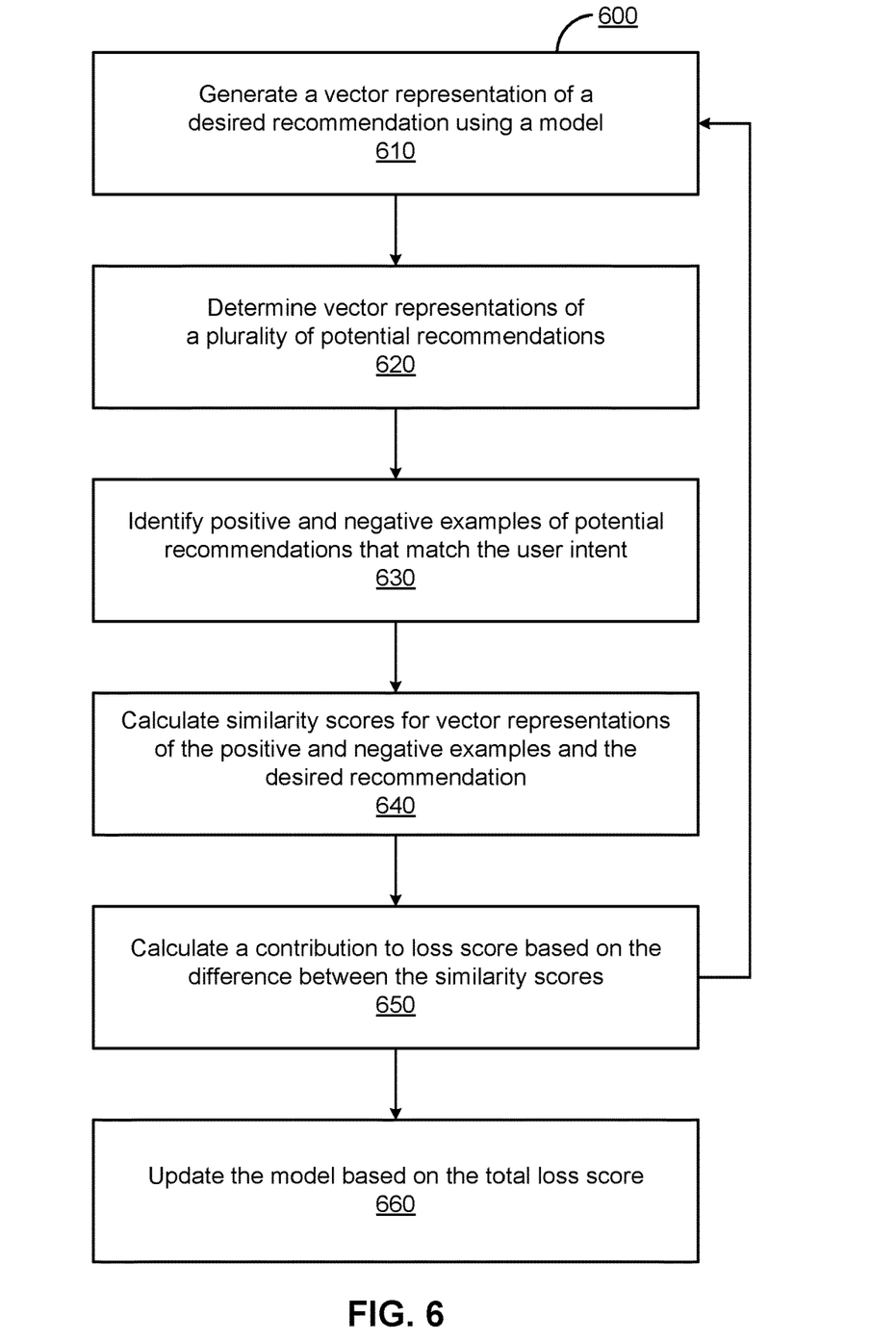
FIG. 6 is a flow chart illustrating a method for training an intent model, in accordance with an embodiment.

FIG. 6 illustrates one embodiment of a method 600 for training a model for generating recommendations using a training data set. The training data set includes examples of messages requesting recommendations (e.g., social network posts) made by users and responses to those requests made by other users (e.g., comments left on social network posts seeking recommendations). The model may initially be randomly seeded, created by a human, or initialized in some other suitable manner. The model may be stored in the model store 360 or another suitable location, including system memory. The steps of FIG. 6 are illustrated from the perspective of the model building module 235 performing the method 600. However, some or all of the steps may be performed by other entities and/or components. In addition, some embodiments may perform the steps in parallel, perform the steps in different orders, or perform different steps. For example, the vector representations of potential recommendations may be generated in advance and stored in a data store (e.g., the training data store 350).

In the embodiment shown in FIG. 6, the method 600 begins with the model building module 235 generating 610 a vector representation of a desired recommendation using a model. The vector representation may be based on the content of a message requesting the desired recommendation and information about the user that made the request, as described above with reference to the request vectorization module 330 of FIG. 3. In one embodiment, the vector representation is a hypothetical ideal recommendation vector generated by applying the model to a vector derived from the content of the message and information about the user making the request (e.g., other entities for which the user has indicated an affinity). In other words, the model generates a vector that it predicts corresponds to an ideal recommendation. The goal of training is to update the model such that this vector is close in vector space to vectors representing entities in the training set that were actually recommended in response to the request by other users (and are thus assumed to be good recommendations). The intent model may be a neural network or any other appropriate type of machine-learning model.

The model building module 235 determines 620 vector representations of a plurality of potential recommendations. As described previously, with reference to FIG. 3, the vector representations of the potential recommendations may be based on information from a knowledge base about the entity to be recommended as well as information about other user's opinion of the entity. The model building module 235 also identifies 630 a positive and a negative example from among the potential recommendations. The positive example is a recommendation that a user provided as a response to the message requesting recommendations. The negative example may be a randomly selected recommendation from the training data or one that a user explicitly identified as non-responsive to the request in the message.

The model building module 235 calculates 640 similarity scores for vector representations of the positive and negative examples and the desired recommendation. The similarity scores indicate how well the positive and negative examples match the intent of the user. In one embodiment, the similarity score for an example (either positive or negative) is the distance in vector space between a hypothetical ideal recommendation vector and the vector representing the example. In other embodiments, other ways of generating similarity scores may be used.

The model building module 235 calculates 650 a contribution to a loss score based on differences between the similarity scores for the positive and negative examples. The contribution to the loss score may simply be to add a fixed amount (e.g., one) to a cumulative loss score for the training data set if certain criteria are not met. For example if the similarity score for the negative example exceeds the similarity score for the positive example, or the similarity score for the positive example does not exceed the similarity score for the negative example by a certain amount (either in absolute or relative terms). Alternatively, the contribution to the loss score may be scaled based on a degree to which the criteria are not met. For example, the amount by which the similarity score for the negative example exceeds the similarity score for the positive example (assuming that it does) might be added to the loss score.

In the embodiment shown in FIG. 6, the model building module 235 repeats steps 610 through 650 across all (or a subset of) the request/response pairs in the training data to calculate a total loss score. The model building module 235 then updates 660 the intent model based on the total loss score. In one embodiment, the model building module 235 applies a back propagation algorithm to try and minimize the total loss score when the intent model is applied to the training data.

Once the intent model has been updated 660, the loss score may be reset (e.g., set to zero) and the method 600 may be repeated to further refine the model. In one embodiment, the method 600 is repeated until either a fixed number of iterations have been performed or the model building module 235 determine that the intent model is sufficiently trained (e.g., if the total loss score for a current iteration was less than a predetermined threshold). The updated model may be stored in the model store 360 or another suitable location.

Figure 7:
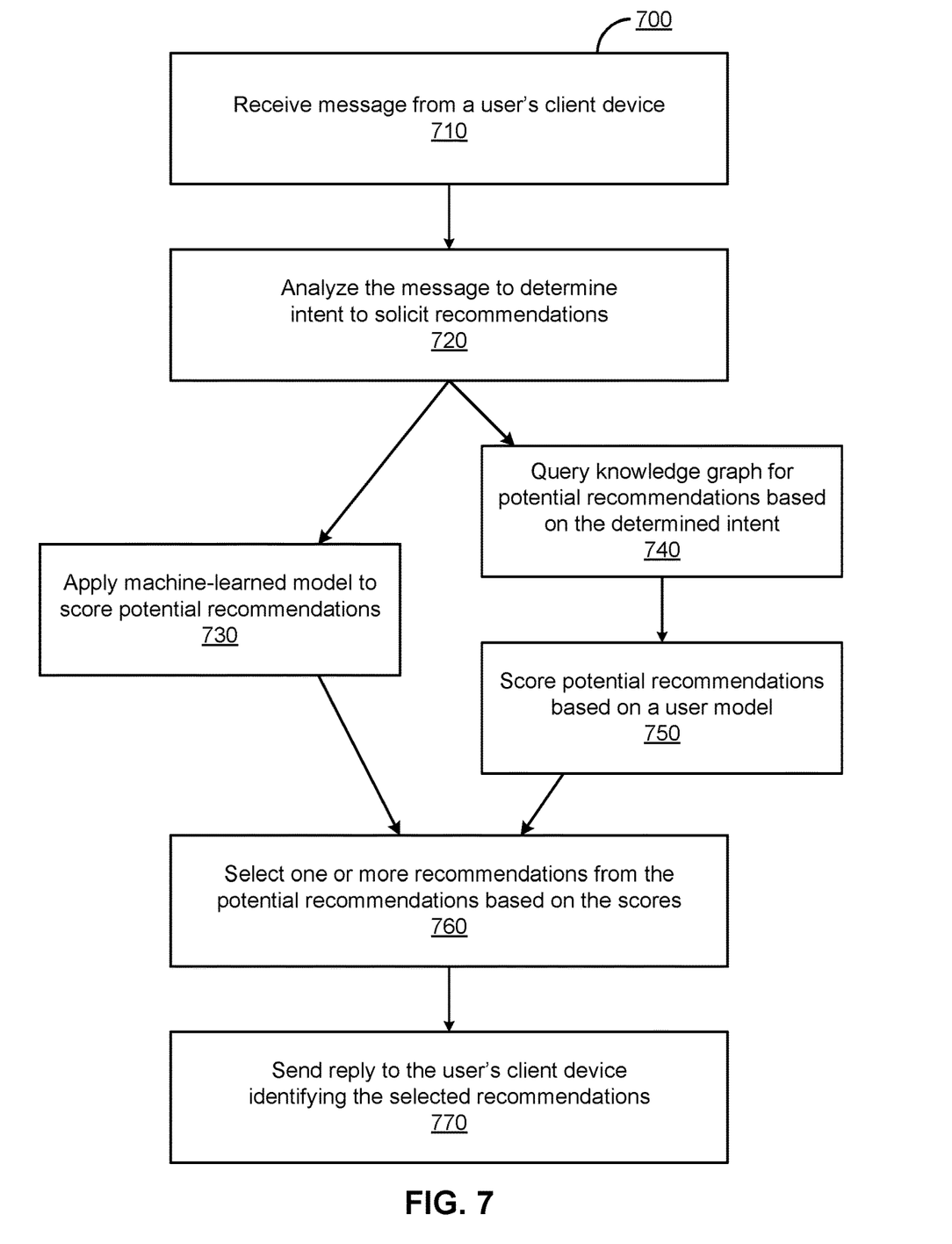
FIG. 7 is a flow chart illustrating a method for providing recommendations to a user, in accordance with an embodiment.

FIG. 7 illustrates one embodiment of a method 700 for providing recommendations to a user. The steps of FIG. 7 are illustrated from the perspective of the virtual assistant 240 performing the method 700. However, some or all of the steps may be performed by other entities and/or components. In addition, some embodiments may perform the steps in parallel, perform the steps in different orders, or perform different steps. For example, although application 730 of the machine-learned model and querying 740 of the knowledge graph are shown as occurring in parallel, they may instead be performed sequentially.

In the embodiment shown in FIG. 7, the method 700 begins with the virtual assistant 240 receiving 710 a message from a user's client device 110. The virtual assistant 240 analyzes 720 the message to determine the user's intent. If the virtual assistant 240 determines that recommendations should not be provided in response to the message, the method 700 may end until another message is received. However, for the purposes of explaining the method 700, it is assumed that the virtual assistant 240 determines that the user's intent is to solicit recommendations (or that providing recommendations in response to the message is otherwise appropriate).

The virtual assistant 240 applies 730 a machine-learned model to score potential recommendations in a corpus (e.g., the recommendations corpus 450). In one embodiment, the virtual assistant 240 calculates a score for each potential recommendation in the corpus. Alternatively, the virtual assistant 240 may calculate scores for a subset of the potential recommendations (e.g., until a pre-determined number of potential recommendations for which the calculated score exceeds a threshold have been identified). The scores may be calculated by comparing a vector representation of the potential recommendations to a hypothetical ideal recommendation generated from the user's request and information about the user, as described previously in the context of movie recommendations with reference to FIGS. 3 and 4.

The virtual assistant 240 also queries 740 a knowledge graph (e.g., in the knowledge store 230) for potential recommendations based on the determined intent. For example, if the determined intent is seeking recommendations for sci-fi movies, the virtual assistant 240 might query the knowledge store 230 for all movies tagged as sci-fi movies. The virtual assistant 240 then scores 750 the potential retrieved recommendations from the knowledge graph based on information about the requesting user. For example, as described previously with reference to FIG. 4, where the recommendations are for movies, the user can be represented by a vector that is generated by combining vectors representing all of the movies for which a user has indicated affinity. The potential recommendations (movies) can then be scored 750 based on the distance between vectors representing those movies and the vector representing the user.

The virtual assistant 240 selects 760 one or more recommendations from among the potential recommendations based on the scores. The scores generated by the machine-learned model and the scores generated for potential recommendations identified by querying the knowledge graph provide two separate sets of scores, with many (or all) of the potential recommendations having a score in each set. The virtual assistant 240 may select 760 the recommendations based on one or both of the sets of scores.

In one embodiment, the virtual assistant 240 selects 760 the recommendations by using both sets of scores to generate a ranked list. The position of each potential recommendation in the ranked list is determined by a total score generated by combining the potential recommendation's score from each set, assuming it has one in both. If it does not have a score in one of the sets, a total score may be estimated by assigning a score of zero in that set, setting its score in that set equal to its score in the other set (assuming the sets of scores are normalized relative to each other), or the like. The virtual assistant 240 then selects one or more recommendations from among the potential recommendations based on the ranked list (e.g., selecting the five highest ranked potential recommendations, selecting any recommendations with a total score above a threshold, and the like). The number of recommendations the virtual assistant 240 selects may be a configurable parameter set by the user.

Regardless of precisely how they are selected 760, the virtual assistant 240 sends 770 a reply to the message identifying the selected recommendations. In one embodiment, the reply may include links or controls to enable the user to purchase, lend, view, or otherwise act on the recommendations. For example, as described previously, if the recommendations are movies, the reply may include links to websites where the user can view or purchase the recommended movies. The reply may also provide information about the recommendations, such as reviews or comments by other users, information extracted from the knowledge store 230 (e.g., cast, crew, genre, and a plot summary in the case of movie recommendations).

Generating recommendations using the techniques described above can provide several advantages. One such advantage is improved efficiency in interactions between the user and the computer. Because the recommendations are generated in part based on a model of the user, the user is less likely to need to spend time determining whether the recommendation is of value to them. The virtual assistant 240 also does not need to spend time asking the user to provide further information about what types of recommendations the user would like to see. For example, if the user simply asks "what movie should I watch tonight?" the virtual assistant 240 may be able to provide a recommendation that the user will enjoy without having to ask the user about preferred genres, etc. Furthermore, in embodiments where the recommendations are generated using both a machine-learned model and information in a knowledge graph, the likelihood that the virtual assistant 240 will provide a valuable recommendation without requesting clarification or further inquiry is increased further.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
  receiving a message at a computing device, the message including content;
  generating an input vector based on the content of the message and entities with which a user has indicated an affinity;
  applying a machine-learned model to map the input vector to a representation of a hypothetical ideal recommendation to provide to the user in response to the message, wherein the machine-learned model was trained using training data including a user request for recommendations and a response to the user request made by another user, the response including a user-recommended entity, training the machine-learned model comprising:
    generating a vector representation of the user-recommended entity as a positive example;
    generating a vector representation of another entity selected from a corpus as a negative example;
    determining a first distance in vector space between the hypothetical ideal recommendation vector and the positive example;
    determining a second distance in vector space between the hypothetical ideal recommendation vector and the negative example; and
    updating the machine-learned model based on the first distance and the second distance;
  retrieving, from a data store, data regarding a plurality of entities, the data regarding each entity including a corresponding entity representation derived from both factual information about the entity and opinions of other users of the entity;
  calculating difference metrics for the entity representations that indicate a degree of difference between a corresponding entity representation and the representation of the hypothetical ideal recommendation;
  determining, based on the difference metrics, ranking scores for at least a subset of the plurality of entities;
  selecting an entity to recommend based on the ranking scores; and
  sending a reply to the message, the reply identifying the selected entity.

2. The method of claim 1, wherein determining the representation of the hypothetical ideal recommendation comprises:
  generating a first vector based on the content of the message;
  generating a second vector based on entities with which the user has indicated an affinity;
  combining the first vector and the second vector to generate the input vector.

3. The method of claim 2, wherein generating the second vector based on entities with which the user has previously indicated an affinity comprises:
  retrieving, from a data store, vector representations of the entities with which the user has previously indicated an affinity; and
  combining the vector representations of the entities with which the user has previously indicated an affinity to generate the second vector.

4. The method of claim 1, wherein training the machine-learned model further comprises:
  generating a vector representation of the user request for recommendations; and
  applying the machine-learned model to the vector representation of the user request for recommendations to generate a hypothetical ideal recommendation vector.

5. The method of claim 1, wherein the entity representation for a given entity is generated by:
  retrieving entity description data and user affinity data from a data store, the entity description data including factual information about the given entity, and the user affinity data indicating opinions of other users regarding the given entity;
  generating a first vector based on the factual information;
  generating a second vector based on the user affinity data; and
  combining the first vector and the second vector to produce the entity representation.

6. The method of claim 1, further comprising:
  analyzing the message content to determine an intent of the user;
  querying a knowledge graph, based on the determined intent of the user, to identify a second plurality of entities, the second plurality of entities including the given entity;
  determining an affinity score for the given entity based on a model of the user, the affinity score indicating an affinity between the user and the given entity,
  wherein the ranking score for the given entity is further based on the affinity score.

7. The method of claim 1, further comprising querying a knowledge graph, based on the determined intent of the user, to identify a second plurality of entities, the second plurality of entities including the given entity, wherein determining the ranking score for the given entity includes:
  determining a first ranking score based on the measure of difference between the entity representation corresponding to the given entity and the representation of the hypothetical ideal recommendation;
  determining a second ranking score based on an affinity score for the given entity based on a model of the user; and
  combining the first ranking score and the second ranking score to calculate a total ranking score.

8. A non-transitory computer-readable medium storing computer program instructions executable by a processor to perform operations comprising:
  receiving a message at a computing device, the message including content;
  generating an input vector based on the content of the message and entities with which a user has indicated an affinity;
  applying a machine-learned model to map the input vector to a representation of a hypothetical ideal recommendation to provide to the user in response to the message, wherein the machine-learned model was trained using training data including a user request for recommendations and a response to the user request made by another user, the response including a user-recommended entity, training the machine-learned model comprising:
    generating a vector representation of the user-recommended entity as a positive example;

generating a vector representation of another entity selected from a corpus as a negative example;
determining a first distance in vector space between the hypothetical ideal recommendation vector and the positive example;
determining a second distance in vector space between the hypothetical ideal recommendation vector and the negative example; and
updating the machine-learned model based on the first distance and the second distance;
retrieving, from a data store, data regarding a plurality of entities, the data regarding each entity including a corresponding entity representation derived from both factual information about the entity and opinions of other users of the entity;
calculating difference metrics for the entity representations that indicate a degree of difference between a corresponding entity representation and the representation of the hypothetical ideal recommendation;
determining, based on the difference metrics, ranking scores for at least a subset of the plurality of entities;
selecting an entity to recommend based on the ranking scores; and
sending a reply to the message, the reply identifying the selected entity.

9. The non-transitory computer-readable medium of claim 8, wherein determining the representation of the hypothetical ideal recommendation comprises:
generating a first vector based on the content of the message;
generating a second vector based on entities with which the user has indicated an affinity;
combining the first vector and the second vector to generate the input vector.

10. The non-transitory computer-readable medium of claim 9, wherein generating the second vector based on entities with which the user has previously indicated an affinity comprises:
retrieving, from a data store, vector representations of the entities with which the user has previously indicated an affinity; and
combining the vector representations of the entities with which the user has previously indicated an affinity to generate the second vector.

11. The non-transitory computer-readable medium of claim 8, wherein training the machine-learned model further comprises:
generating a vector representation of the user request for recommendations; and
applying the machine-learned model to the vector representation of the user request for recommendations to generate a hypothetical ideal recommendation vector.

12. The non-transitory computer-readable medium of claim 8, wherein the entity representation for a given entity is generated by:
retrieving entity description data and user affinity data from a data store, the entity description data including factual information about the given entity, and the user affinity data indicating opinions of other users regarding the given entity;
generating a first vector based on the factual information;
generating a second vector based on the user affinity data; and
combining the first vector and the second vector to produce the entity representation.

13. The non-transitory computer-readable medium of claim 8, wherein the operations further comprise:
analyzing the message content to determine an intent of the user;
querying a knowledge graph, based on the determined intent of the user, to identify a second plurality of entities, the second plurality of entities including the given entity;
determining an affinity score for the given entity based on a model of the user, the affinity score indicating an affinity between the user and the given entity,
wherein the ranking score for the given entity is further based on the affinity score.

14. The non-transitory computer-readable medium of claim 8, wherein the operations further comprise querying a knowledge graph, based on the determined intent of the user, to identify a second plurality of entities, the second plurality of entities including the given entity, and wherein determining the ranking score for the given entity includes:
determining a first ranking score based on the measure of difference between the entity representation corresponding to the given entity and the representation of the hypothetical ideal recommendation;
determining a second ranking score based on an affinity score for the given entity based on a model of the user; and
combining the first ranking score and the second ranking score to calculate a total ranking score.

15. A computer system comprising:
one or more processors; and
one or more computer readable media storing computer program instructions that, when executed, cause the one or more processors to perform operations including:
receiving a message at a computing device, the message including content;
generating an input vector based on the content of the message and entities with which a user has indicated an affinity;
applying a machine-learned model to map the input vector to a representation of a hypothetical ideal recommendation to provide to the user in response to the message, wherein the machine-learned model was trained using training data including a user request for recommendations and a response to the user request made by another user, the response including a user-recommended entity, training the machine-learned model comprising:
generating a vector representation of the user-recommended entity as a positive example;
generating a vector representation of another entity selected from a corpus as a negative example;
determining a first distance in vector space between the hypothetical ideal recommendation vector and the positive example;
determining a second distance in vector space between the hypothetical ideal recommendation vector and the negative example; and
updating the machine-learned model based on the first distance and the second distance;
retrieving, from a data store, data regarding a plurality of entities, the data regarding each entity including a corresponding entity representation derived from both factual information about the entity and opinions of other users of the entity;
calculating difference metrics for the entity representations that indicate a degree of difference between a corresponding entity representation and the representation of the hypothetical ideal recommendation;
determining, based on the difference metrics, ranking scores for at least a subset of the plurality of entities;
selecting an entity to recommend based on the ranking scores; and
sending a reply to the message, the reply identifying the selected entity.

16. The computer system of claim 15, wherein determining the representation of the hypothetical ideal recommendation comprises:
generating a first vector based on the content of the message;
generating a second vector based on entities with which the user has indicated an affinity;
combining the first vector and the second vector to generate the input vector.

17. The computer system of claim 15, wherein training the machine-learned model further comprises:
generating a vector representation of the user request for recommendations; and
applying the machine-learned model to the vector representation of the user request for recommendations to generate a hypothetical ideal recommendation vector.

18. The computer system of claim 15, wherein the entity representation for a given entity is generated by:
retrieving entity description data and user affinity data from a data store, the entity description data including factual information about the given entity, and the user affinity data indicating opinions of other users regarding the given entity;
generating a first vector based on the factual information;
generating a second vector based on the user affinity data; and
combining the first vector and the second vector to produce the entity representation.

19. The computer system of claim 15, wherein the operations further include:
analyzing the message content to determine an intent of the user;
querying a knowledge graph, based on the determined intent of the user, to identify a second plurality of entities, the second plurality of entities including the given entity;
determining an affinity score for the given entity based on a model of the user, the affinity score indicating an affinity between the user and the given entity,
wherein the ranking score for the given entity is further based on the affinity score.

20. The computer system of claim 15, wherein the operations further include querying a knowledge graph, based on the determined intent of the user, to identify a second plurality of entities, the second plurality of entities including the given entity, and wherein determining the ranking score for the given entity includes:
determining a first ranking score based on the measure of difference between the entity representation corresponding to the given entity and the representation of the hypothetical ideal recommendation;
determining a second ranking score based on an affinity score for the given entity based on a model of the user; and
combining the first ranking score and the second ranking score to calculate a total ranking score.

* * * * *